No. 695,476. Patented Mar. 18, 1902.
J. McFARLANE.
PROCESS OF HULLING COTTON SEED.
(Application filed Sept. 3, 1901.)

(No Model.)

1
ALKALI TANK

2
CHLORIDE OF SODIUM TANK

3
CLEAR WATER TANK

4
DRIER

Witnesses

Inventor
John McFarlane
By D. R. Reinohl
Attorney

UNITED STATES PATENT OFFICE.

JOHN McFARLANE, OF WASHINGTON, DISTRICT OF COLUMBIA, ASSIGNOR OF ONE-HALF TO DAVID C. REINOHL, OF WASHINGTON, DISTRICT OF COLUMBIA.

PROCESS OF HULLING COTTON-SEED.

SPECIFICATION forming part of Letters Patent No. 695,476, dated March 18, 1902.

Application filed September 3, 1901. Serial No. 74,134. (No specimens.)

*To all whom it may concern:*

Be it known that I, JOHN MCFARLANE, a citizen of the United States, residing at Washington, in the District of Columbia, have invented certain new and useful Improvements in Processes of Hulling Cotton-Seed; and I do hereby declare the following to be a full, clear, and exact description of the invention, such as will enable others skilled in the art to which it appertains to make and use the same.

My invention relates to the art of hulling cotton-seed, has for its object a rapid and perfect removal of the hulls from cotton-seed without injury to the kernel, as a food or other product, or injury to the hulls or the lint for subsequent use in the arts in which they are commonly used, and consists in certain steps of treatment which will be fully disclosed in the following specification and claims.

Cotton-seed as they come from the gin incased in their hulls and lint or delinted seed are immersed in a solution of alkali, such as potash, caustic soda, or concentrated lye of commerce, properly diluted with water and contained in a suitable receptacle, such as a tank or vat, and permitted to remain in the solution until the hulls open and the kernels separate therefrom, when the kernels denuded all of their covering except the pericarp rise to the surface of the liquid, where they are collected and removed for subsequent treatment.

The solution is used at a temperature of from 100° to 150° Fahrenheit or more and of a strength ranging from 2° to about 5° Baumé and the seed retained in the solution from twenty to thirty minutes or longer, according to the age of the seed, thoroughly immersed, when the hulls open and the kernels, released from their confinement and being of less specific gravity than the hulls and the lint in their saturated condition, rise to and float upon the surface of the liquid. For seed not more than a year old about 4° Baumé is preferred, and fresh seed may be treated with a solution of about 2° Baumé by increasing the temperature thereof. To eradicate the alkali and remove it from the surface or extract it from the now-hulled seed or kernels, they are removed from the receptacle in which they have thus far been treated and immersed in an alkali eradicating and extracting solution, preference being given to chlorid of sodium, (common salt,) contained in a suitable receptacle, such as a tank or vat, at a normal temperature and of a strength of about 20° Baumé and the kernels retained in the solution from twenty to thirty minutes or longer, according to the length of time they have been exposed to the alkali solution. The kernels, inclosed in their pericarp only, are then thoroughly washed in clear water in any suitable receptacle, such as a tank or vat, when all trace of the alkali and the chlorid of sodium will have been removed and the kernels thoroughly cleansed. The kernels may then be removed from the vat and thoroughly dried, as in a drying-room, a kiln, or in a suitable mechanical drier, to which heat is applied at a degree not to scorch or shrink the kernels. By drying the kernels the meat of the kernel becomes hard and prevents the oil oozing out and wasting. After the kernels have been cleansed they may, however, be taken direct to an oil-press or other means for extracting oil, or they may be dried and subsequently treated in the usual manner for preparing cotton-seed for extracting oil, or, after drying, the kernels may be put in suitable sacks for transportation. The separated kernels or the entire body of kernels, hulls, and lint may be taken direct to a press or other means and the oil extracted therefrom, or the kernels may be washed and subsequently dried for shipping, or they may be taken directly from the alkali bath and dried, and the hulls and the lint may be baled and subsequently converted into paper-stock or used for other purposes in the arts. The hulls and the lint are removed from the first vat, and after proper treatment they may be used for various purposes well known in the arts.

The alkali solution may be used repeatedly upon different charges of cotton-seed, and the saline solution may also be used repeatedly, according to the amount of alkali deposited therein, and the quantity and strength of each solution may be maintained by adding water and the proper ingredient to each as it becomes weakened by use.

When seed are treated in bulk or large quantity or when seed several years old are treated, agitation of the seed, the hulls, and the lint is necessary to free or release the kernels from the hulls and the entangled lint as they lie in the vat, and in the treatment of old seed more time will be required to open the hulls and separate the kernels therefrom.

In the treatment of old seed the length of time required to open the hulls and separate the kernels from the hulls in the alkali solution of the strength described causes the kernels to absorb the liquid and become "water-logged," when they will not rise to the surface of the liquid, but must be removed with the hulls and lint and subsequently separated therefrom. To prevent this effect upon the kernels, the temperature of the solution may be increased to about 190° Fahrenheit and the strength also increased to about 5° Baumé and the hulls opened in less time.

For the purpose of illustration the accompanying drawing represents a diagrammatic plan view of means adapted for carrying out the invention, and in which—

1 indicates a tank in which seed may be denuded of their hulls by subjecting them to a solution of alkali; 2, a like receptacle in which the kernels may be treated to a solution, such as chlorid of sodium or common salt, to eradicate the alkali; 3, a like receptacle for clear water in which to cleanse the kernels, and 4 a drier.

Having thus fully described my invention, what I claim is—

1. The process of hulling cotton-seed, which consists in subjecting the seed to a solution of alkali until the hulls open and the kernels separate therefrom.

2. The process of hulling cotton-seed, which consists in subjecting seed to a solution of alkali until the hulls open and the kernels separate therefrom, then subjecting the kernels to a liquid to eradicate the alkali, and then washing the kernels.

3. The process of hulling cotton-seed, which consists in subjecting seed to a solution of alkali until the hulls open and the kernels separate therefrom while the seed are immersed in the solution, then subjecting the kernels to an alkali-eradicating solution, and then washing the kernels.

4. The process of hulling cotton-seed, which consists in subjecting seed incased in their hulls to a solution of alkali of about 4° Baumé and of a temperature above normal until the hulls open and the kernels separate therefrom.

5. The process of hulling cotton-seed, which consists in subjecting seed incased in their hulls to a solution of alkali until the hulls open and the kernels separate therefrom, and then drying the kernels.

6. The process of hulling cotton-seed, which consists in subjecting seed incased in their hulls to a solution of alkali until the hulls open and the kernels separate therefrom, then subjecting the kernels to a solution of chlorid of sodium to eradicate the alkali, then washing the kernels and finally drying the kernels.

7. The process of hulling cotton-seed, which consists in subjecting seed incased in their hulls and lint to a diluted solution of concentrated lye of commerce until the hulls open and the kernels separate therefrom, then subjecting the kernels to a solution of chlorid of sodium to eradicate the lye, and then washing the kernels.

8. The product described, whole cotton-seed kernels denuded of their lint and hulls, and dried.

In testimony whereof I affix my signature in presence of two witnesses.

JOHN McFARLANE.

Witnesses:
D. C. REINOHL,
W. PARKER REINOHL.